Feb. 12, 1957     D. C. RICHARDS     2,781,502
SELF-ORIENTING GEOPHONE
Original Filed Jan. 21, 1949     2 Sheets-Sheet 1
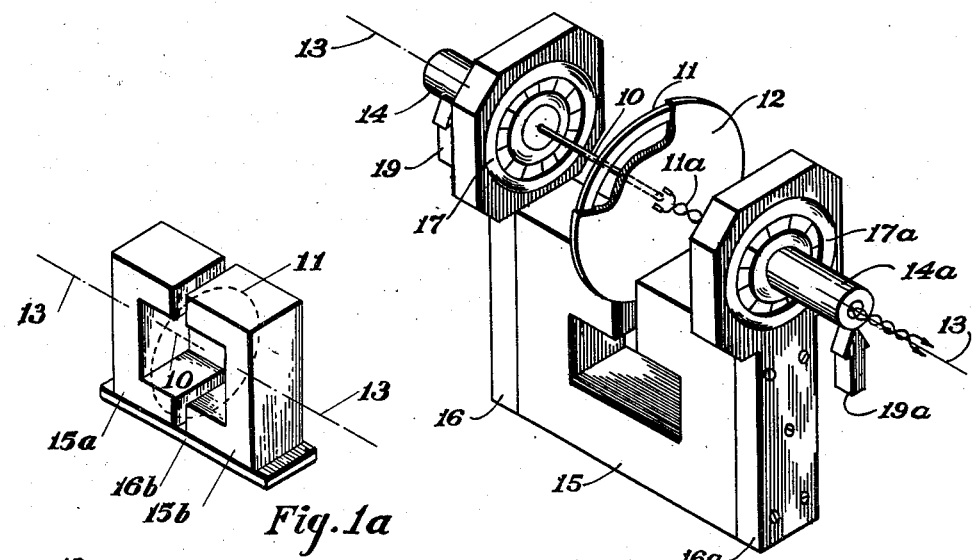
Fig. 1a
Fig. 1
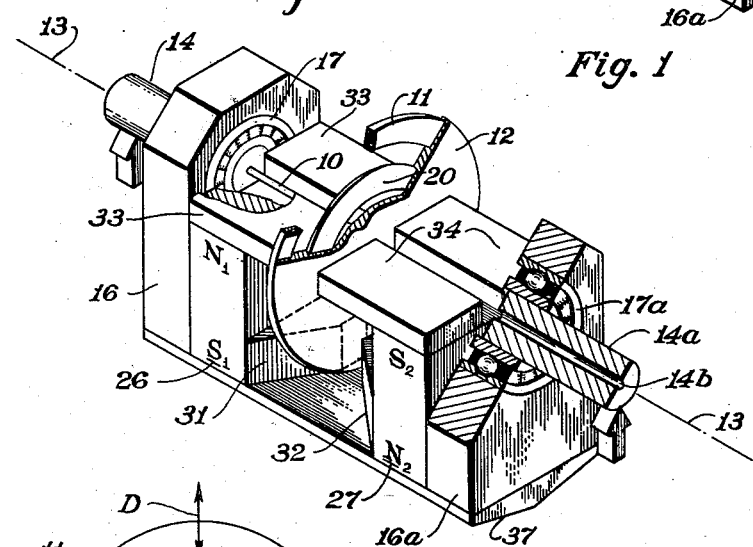
Fig. 2
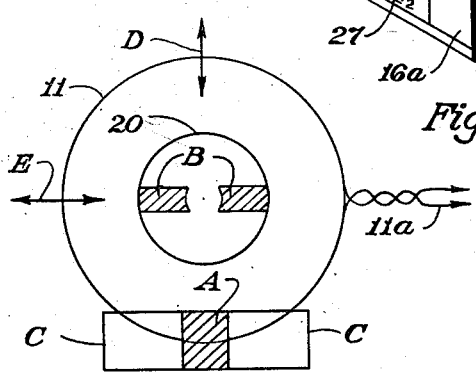
Fig. 3
David C Richards
INVENTOR.
BY Sidney A. Johnson
ATTORNEY Feb. 12, 1957 D. C. RICHARDS 2,781,502
SELF-ORIENTING GEOPHONE
Original Filed Jan. 21, 1949 2 Sheets-Sheet 2

David C. Richards
INVENTOR.

BY *Sidney G. Johnson*

ATTORNEY

United States Patent Office 2,781,502
Patented Feb. 12, 1957

2,781,502
SELF-ORIENTING GEOPHONE

David C. Richards, Dallas, Tex., assignor, by mesne assignments, to Socony Mobil Oil Company, Inc., a corporation of New York Continuation of abandoned application Serial No. 71,952, January 21, 1949. This application March 18, 1954, Serial No. 417,121

8 Claims. (Cl. 340—17)

This invention relates to vibration detectors and more particularly to a self-orienting vibration sensitive device which generates a voltage having a constant phase relationship with respect to driving motion for a plurality of positions.

The device of the present is particularly useful in seismic prospecting systems where sensitive detectors or geophones are placed at a plurality of points usually along a predetermined line for detection of ground vibrations. Upon detonation of an explosive charge, the detector fastened to or vibrating with the surface of the earth generates voltages proportional to the ground motion.

This application is a continuation of earlier filed application Serial No. 71,952, filed January 21, 1949, now abandoned.

Conventional geophones must be properly orientated as they are placed on the earth in order to generate voltages of proper phase with respect to the driving ground motion and one to the other. Further, a plurality of geophones are usually set out in a spread with cables connecting each geophone to recording instruments located at a point remote from the geophones. The necessity of properly orientating each geophone and making separate connections to each is tedious and time consuming.

In accordance with the present invention, a geophone which may be conveniently included in a seismic cable is so constructed that for any angular position with respect to a substantially horizontal axis of the cable there will be a constant phase relationship between the voltage generated and ground motion. More particularly, the vibration sensitive device of the present invention includes a non-directional vibratory system symmetrical with respect to a horizontal axis with a mass magnetically coupled to the vibratory system. Means are provided for mounting the mass for rotation about the horizontal axis of the vibratory system for generation of a voltage upon variation of the magnetic coupling between the vibratory system and the mass. The vibratory system may include two coils; a first coil for generation of a working voltage in coaction with a magnet associated with the mass, and a second coil to provide a stiffness in the non-directional vibratory system with respect to horizontal vibration. The coil structure is permitted no rational movement with respect to a housing or case. The mass magnetically coupled thereto is free to rotate in the housing without interference from leads from the coil structure.

For a more detailed explanation of the invention and for further objects and advantages thereof, reference may now be had to the following description taken in conjunction with the accompanying drawings in which:

Fig. 1 diagrammatically illustrates the invention in one form thereof;

Fig. 1a is a modification of Fig. 1 with certain parts omitted;

Fig. 2 illustrates a further modification of the device of Fig. 1;

Figure 6:
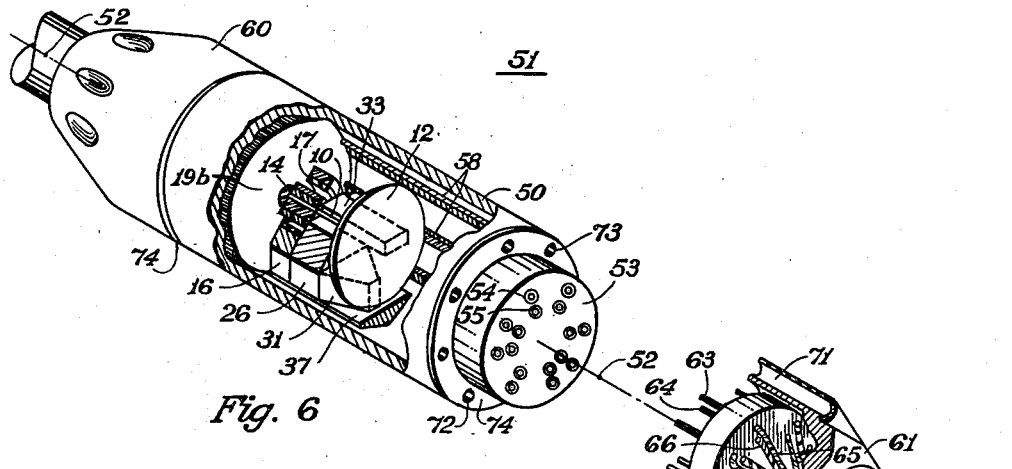
Figure 4:
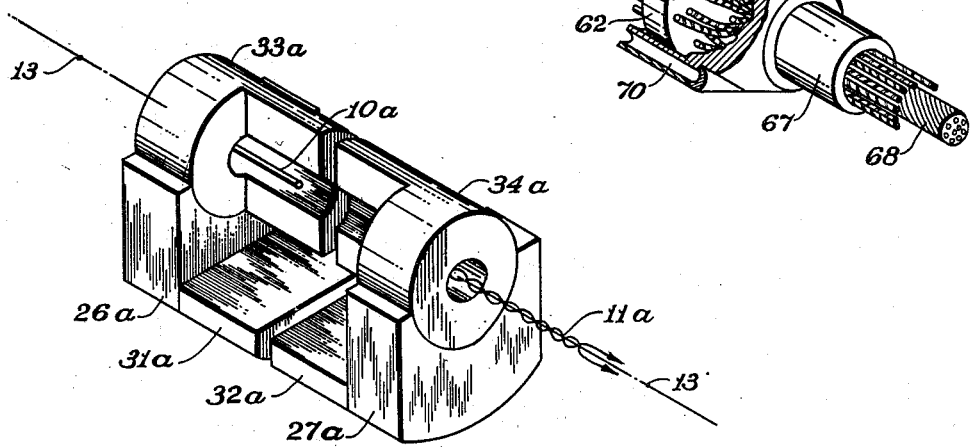
Figure 5:
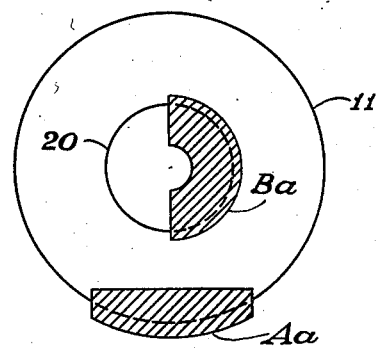

Fig. 3 diagrammatically illustrates the coils and magnetic fields of Fig. 2;

Fig. 4 illustrates a modified magnetic system;

Fig. 5 is a diagrammatic representation of the magnetic fields and the coils of Fig. 4; and Fig. 6 illustrates a length of a seismic cable which houses a self-orienting geophone.

Referring now to Fig. 1, a geophone constructed in accordance with the present invention is illustrated as comprising a substantially horizontal straight rod spring 10 and a coil 11 mounted at the periphery of a disc 12 forming a non-directional vibratory system. The spring 10, coil 11 and disc 12 are positioned coaxially and symmetrically with respect to the axis 13—13. The coil 11 comprises a plurality of turns of wire, and is circular in shape with a radius large compared with the radial extent of the coil windings which are uniformly distributed about its periphery. The disc 12 supporting coil 11 is carried by one end of the spring 10. The spring is preferably of circular cross section. As illustrated in Fig. 1, the left end of the spring 10 is supported by a stud 14. Thus mounted, the spring acts as a non-directional cantilever support for the disc 12 mounted on its free end. Since the mounting is non-directional and the distance between the stud 14 and disc 12 is fixed, the disc 12 is free to vibrate in a substantially spherical surface whose center is at the juncture of stud 14 and spring 10. This is in contrast with vibration along a line or in a cylindrical surface in systems where flat springs are used. Further, and as illustrated, a mass including a permanent magnet 15 having an air gap extending across only a minor fraction, as less than half, of the circumference of the coil is supported from the left-end mounting 14 and from a similar mounting 14a on the right and is free to rotate about the axis 13—13 of the spring 10 which is parallel to and spaced from the length of the air gap. The air gap extends in width but partially circumferentially of the coil 11. Brackets 16 and 16a fastened to opposite arms of the magnet 15 house ball bearings 17 and 17a which in turn are pressed on the studs or mountings 14 and 14a respectively.

With the construction above described, upon rotation of the coil 11 and disc 12 to any angular position with respect to the horizontal axis 13—13, the magnet 15, supported in freely gravity-controlled rotational relation to said axis, is gravitationally positioned so that the lowermost portion of the coil 11 is in the air gap of the magnet 15. If the supports 14 and 14a are fastened to a housing or otherwise supported from the earth, as generically indicated by arrows 19 and 19a, an impulse from below, driving the mountings 14 and 14a upwards, will cause relative motion between the coil 11 and the magnet 15. This action is due to the inertia of the coil disc 12 resiliently supported by spring 10. Variation in the coupling or the flux linking the windings of coil 11 due to such relative motion generates a voltage proportional to the vertical component of velocity of vibration independent of the relative rotation between the coil and the magnet. The voltage generated has a constant phase relation with respect to motion of the ground for any angular position with respect to axis 13—13. Leads 11a from coil 11, threading axially through the mounting 14a may be connected to suitable conductors leading to amplifying and recording apparatus, there to record the vertical component of velocity.

A geophone constructed in accordance with the foregoing description may assume any angular position with respect to its horizontal axis. The magnet 15 always will be positioned below the axis. The magnet is free to rotate in complete absence of interference to rotation by leads from the coil 11. Since the coil is fixed with respect to the housing it will be self-orienting without the necessity of slip rings or friction contacts in the circuit of coil 11.

Fig. 1a illustrates a modification of Fig. 1. The spring 10 and coil 11, shown dotted, are mounted symmetrically with respect to axis 13—13. Two C-magnets 15a and 15b also are mounted symmetrically with respect to the axis 13—13. The magnets 15a and 15b are to be supported for rotation about the axis of symmetry 13—13 by brackets (not shown) similar to brackets 16 and 16a of Fig. 1. The brackets alone may add to the magnet system sufficient mass asymmetrical to the axis to provide the requisite gravitational bias. However, a heavy-metal non-magnetic bar 16b, such as lead, may be fastened to the lower ends of supporting brackets and to magnets 15a and 15b to increase the gravitational bias.

In this modification, the magnets are assembled in series circuit, i. e., with a north pole of magnet 15a and the south pole of the magnet 15b at the same air gap. The coil structure, whose turns are symmetrically disposed about the axis 13—13 which is normal to the plane of the coil 11 and passes through the center thereof, is so mounted that it will vibrate freely with a portion of the coil in an air gap above the axis and a portion in an air gap below the axis. For any angular position or rotation of the coil 11, the uppermost portion of the coil and the lower portion thereof will be positioned in air gaps for generation of a voltage proportional to the vertical component of vibration.

The modification of Fig. 1a possesses distinct advantages over Fig. 1. Where two air gaps are utilized the circumferential length of the coil 11 actually working in an air gap is effectively doubled. This produces an increase in sensitivity. Additionally, since the magnet structure is substantially symmetrical to the axis of rotation the overall diameter of the housing may be considerably less than in the modification of Fig. 1.

In the modification illustrated in Fig. 2, means are provided for damping the horizontal vibrations without affecting the vertical sensitivity. Referring to Fig. 2, where parts corresponding to those of Fig. 1 have been given the same reference character, the coil 11, partially broken away, is carried by or forms a part of the disc 12. The disc 12 is supported by spring 10 from the mounting 14. As in the modification of Fig. 1, shafts 14, 14a, spring 10 and disc 12 are mounted coaxially. In addition to coil 11, the modification of Fig. 2 includes a second coil 20 of smaller diameter than coil 11. The coil 20 may form a part of or otherwise be carried by the disc 12. A pair of leads from coil 11, not shown, may be threaded through the hole 14b in the shaft or mounting 14a and may be connected to amplifier-recording instruments as above-described in connection with Fig. 1. The coil 11 is preferably of impedance suitable to be coupled to amplifying instruments. In contrast, the coil 20 is preferably of very low impedance and may be a disc or washer of a metal having low resistivity. Alternatively, it may comprise a plurality of turns of copper conductors with the ends short-circuited.

In this modification which utilizes two coils, the magnetic structure includes two magnets and has two air gaps positioned at unequal distances from the axis or rotation. More particularly, magnets 26 and 27 are arranged in series circuit relation. The flux path between the south pole $S_1$ of magnet 26 and the north pole $N_2$ of magnet 27 includes a pole piece 31 fastened to magnet 26 and pole piece 32 fastened to magnet 27. The flux path includes the air gap between the juxtaposed faces of the pole pieces 31 and 32. The dimensions of the magnets 26 and 27 and pole pieces 31 and 32 are such that with coil 11 normally centered on axis 13—13, the lower horizontal portion thereof will lie in the air gap between faces of the pole pieces 31 and 32. The magnet circuit further includes a pair of pole pieces 33 connected to the north end $N_1$ of magnet 26 and a similar pair of pole pieces 34 connected to the south end $S_2$ of magnet 27. The pole pieces 33 are spaced laterally so that the spring 10 may vibrate without obstruction. One of the pole pieces 33 has been partially broken away, more clearly to illustrate the position of the spring 10 and the coacting parts. In a similar manner the pole pieces 34 are spaced one from the other to provide a passage or channel for the leads from coil 11 to the mounting 14a. The magnets 26 and 27 carrying the pole pieces 33 and 34, respectively, are preferably equal in width to the maximum diameter of the coil 20. Further, with the center of disc 12 positioned at the geometric center of the air gap between the ends of the pole pieces 33 and 34 the portions of the periphery of coil 20 whose tangent is vertical preferably will be positioned in and at the outer edges of the air gap.

In operation, the geophone of Fig. 2 generates a working voltage in coil 11 upon coaction with the flux in the air gap between pole pieces 31 and 32 which is proportional to the vertical component of the velocity of vibration while horizontal vibrations are damped out by coaction between the flux between pole pieces 33 and 34 and current flowing in coil 20. This operation may best be understood by reference to Fig. 3 which diagrammatically represents coils 11 and 20 and the associated magnetic fields as viewed from along the axis 13—13. The shaded portion A represents the magnetic flux between the pole pieces 31 and 32. The flux field A may be limited to the configuration indicated or may be extended to take the form of the rectangle C. As illustrated, coil 11 works in the flux A. Upon vibration of the coils in a vertical direction indicated by the double-ended arrow D, a voltage is generated in coil 11 proportional to the velocity of the vertical vibration. If the diameter of coil 20 is large with respect to the amplitude of vibration, there will be little if any change in the amount of flux B linking coil 20, thus no voltage is generated therein. On the other hand, for horizontal vibrations as indicated by the double-ended arrow E there is a substantial voltage generated in coil 20. This voltage has a frequency twice the frequency of vibration. At the same time there is little if any change in the flux A linking coil 11 and consequently substantially no voltage is generated in coil 11 for horizontal vibration. If coil 11 is of relatively high impedance there will be little damping with respect to vertical vibrations and the voltage from leads 11A may be amplified and recorded. However, the coil 11 may be critically damped by selection of the mass of the coil, the stiffness of the spring, the resistance of the coil and the terminating impedance whereby, in accordance with Lenz's law, the currents induced in the coil 11 are of such magnitude that they react with the flux A to produce damping as desired. Such procedures are well known and understood by those skilled in the art. If coil 20 has relatively low impedance the reaction between the currents flowing therein and the flux B may substantially damp horizontal vibrations.

In the form of geophone above described, a non-directional vibratory system is provided with a gravitationally biased magnetic system which properly positions a first flux field for coaction with a first coil to generate a working voltage and positions a second flux field for coaction with a second coil to produce a stiffness with respect to horizontal vibrations in the normally non-directional vibrating system.

In Fig. 4 there is illustrated a modified magnet system which may be substituted for that of Fig. 2. Parts corresponding to those in Fig. 2 have been given the same reference character with the addition of the suffix "a." The magnet system of Fig. 4 includes magnet 26a and magnet 27a poled in the same manner as in Fig. 2. The pole pieces 31a and 32a are fastened to the lower ends of the magnets 26a and 27a, respectively. The flux Aa between the faces of pole pieces 31a and 32a is illustrated in the shaded portion of Fig. 5. The configuration of the flux field Aa is similar to field A of Fig. 3, and its coaction with coil 11 in generation of a working voltage likewise is the same. However, flux Ba and coil 20 cooperate to produce horizontal stiffness in a somewhat different manner. More particularly, in Fig. 4, the pole pieces 33a and 34a are formed from cylindrical stock of magnetic material. One end of the pole piece 33a is fastened into and received by the upper end of magnet 26a. One-half of the free end of the pole piece 33a has been cut away on a vertical plane passing through the axis 13—13 and is semi-cylindrical in shape. Similarly, one end of the pole piece 34a is fastened to and received by the upper end of magnet 27a. The free end thereof is shaped the same as the free end of pole piece 33a. The ends or faces of pole pieces 33a and 34a are spaced one from the other by an amount equal to desired air gap length. For the purpose of the present description, the term "length" as applied to the air gap associated with the magnet structure means the dimension parallel to the lines of flux in the air gap. The diameter of the stock from which pole pieces 33a and 34a are made is preferably greater than the diameter of coil 20.

The normal orientation of the magnetic fields of the flux path of Fig. 4 and their associated coils is illustrated in Fig. 5. The diameter of the pole pieces 33a and 34a and/or the coil 20 are chosen so that coil 20 will not normally travel vertically beyond the boundary of the flux Ba for the maximum amplitude of vibrations. Consequently, no voltage is generated in coil 20 for vertical vibrations. For horizontal vibration, however, there is a considerable change in the flux Ba linking coil 20. The currents thus generated, reacting with flux Ba, add stiffness to the normally non-directionl vibrating system in a horizontal direction.

Pole pieces 33a and 34a are provided with a central opening or passageway. As illustrated, the spring 10a is positioned in the central passage of the pole piece 33a while the leads 11a from coil 11 are threaded through the passageway in the pole piece 34a. Since the magnetic system of Fig. 4 may be substituted for that of Fig. 2, the coils and the ball bearing mountings have not been illustrated in Fig. 4 for the purposes of simplicity.

In the modification of Figs. 2 and 4, the damping of the horizontal vibration may conveniently be modified or controlled independently of the shape of the air gaps and the sensitivity with respect to vertical vibrations. The widest range of control is possible if the reluctances of the two air gaps are normally equal. When such is the case, a magnetic shunt or path of variable reluctance may be connected from the bottom end of magnet 26 to the bottom end of magnet 27. Such a shunt may be included as a part of the non-magnetic member 37 of Fig. 2. The member 37 normally lends rigidity to the magnet system. However, if a magnetic element or shunt is included therewith and the reluctance of the element or shunt is varied from a value high with respect to the reluctance of the air gap between the pole pieces 31 and 32 to a value low with respect thereto, the flux B, Fig. 3, may be varied by a factor of 2.

In the modifications of Figs. 1, 1a, 2 and 4, the faces of the pole pieces are illustrated as being planar. If the disc 12 is to vibrate freely in a spherical surface passing through both air gaps and the gaps are to be of minimum length, the faces of the pole pieces will be shaped to permit such unobstructed travel of the disc 12 within the maximum limits of vibration.

It will be apparent that a geophone constructed in accordance with the present invention may conveniently be included in a seismograph cable. It lends itself to such a construction since the inner dimensions of the geophone housing needs to be but slightly greater than the diameter of the coil 11. A portion of a sectionalized seismograph cable including a geophone constructed in accordance with the present invention is illustrated in Fig. 6. The central cylindrical portion 50 of the cable 51 comprises the housing shown partially broken away for a unit such as illustrated in either Figs. 1, 2, or 4. Parts of the modification of Fig. 2 have been illustrated partially in section in the cable of Fig. 6. The section is taken along a 45° line passing through the axis of spring 10. The axis 13—13 of Fig. 2 coincides with or is parallel to axis 52—52 of Fig. 6. The magnet system including bracket 16, magnet 26 and pole pieces 31 and 33 rotate about axis 52—52. The remaining parts of the magnet system have been omitted. Coil disc 12 mounted on spring 10 is supported from mounting stud or stub shaft 14. The mounting stud 14 is supported by or forms a part of a disc shaped end member 19b which in an assembled unit provides the support indicated by arrows 19 and 19a (Figs. 1 and 2).

At each end of the housing 50, there is located a connector assembly 53. In the form illustrated in Fig. 6, the connector assembly includes 8 pairs of jacks such as the pair comprising jacks 54 and 55 oriented symmetrically about the axis 52—52. The leads 11a from coil 11 are connected to a selected pair of jacks such as, for instance, the jacks 54 and 55. Each pair of jacks in the unit 53 are connected to corresponding pairs of jacks in a similar unit located at the opposite end of the geophone 50.

The geophone unit with the female jack or connector assemblies 53 at each end thereof may then form an integral part of a seismic cable. The unit serves not only as a housing for the geophone elements but as a sheath for that portion of the cable conductors. To illustrate, conductors 58 are threaded through the geophone along the walls of the cylindrical portion 50 and serve to interconnect jacks such as 54 and 55 to corresponding pairs in the other end of the geophone. Coupled mechanically to each end of the geophone 50 are cable end members 60 and 61. Each of the end members houses male connector units such as the unit 62. The unit 62 carries a plurality of plugs which are complementary with the jacks of the unit 53. As illustrated, the plugs 63 and 64 will be inserted into the jacks 54 and 55. Two of the electrical conductors, the conductors 65 and 66, are connected to plugs 63 and 64 respectively and are a part of the sectionalized conductor portion 67 of the cable 51. Similar conductors are connected to each of the remaining plugs of the unit 62. The conductor portion 67 of the cable 51 extends to units similar to the geophone 50. Since there are eight pairs of plugs and jacks and eight pairs of conductors, a cable including eight geophone units may conveniently be assembled. The conductor portion 67 intermediate each pair of geophones includes, in addition to the conductors, a tension bearing member 68, which may be a steel rope or the like. The rope 68 is mechanically connected to the cable end member 61 in such a manner that the tensile forces may be transmitted thereto. The cable end member 61 may be mechanically coupled to the geophone by screws in holes such as the holes 70 and 71 positioned about the periphery of the cable end member 61. Such screws are served tightly in the holes 72 and 73 tapped in the housing 50 to receive them. The gasket 74 maintains a water-tight seal between the geophone 50 and the cable end members 60 and 61.

With the construction illustrated in Fig. 6, a cable may be assembled comprising a plurality of units like geophone 51 and cable sections of predetermined length such as the section 67 intermediate each pair of geophones. Such a geophysical cable unit may be conveniently reeled onto and out from a truck or for underwater surveying from a boat to set out a spread of geophones without the necessity of giving detailed attention to spacing one geophone from another or to individual geophone orientation as is necessary using conventional geophones. For any angular position of the cable geophones with respect to a substantially horizontal axis the magnetic system forming a part of each geophone will be positioned properly with respect to its associated coil due to the gravitational bias for generation of a voltage proportional to the vertical component of the velocity of ground motion at each geophone location. It is to be noted that it is preferable to operate the geophone with its axis horizontal. It may, however, be operated at a substantial angle from horizontal with the effect that earth movement in direction normal to the axis of the geophone will determine the voltage generated. This movement may include horizontal components as well as vertical, which in some applications may be tolerated. Details of cable construction, suitable end-members and plugs, etc., are described more fully in co-pending application Serial No. 14,155 of Kenneth W. McLoad, a co-worker of applicant.

Though the invention has been illustrated by several modifications thereof, it is to be understood that further modifications within the scope of the appended claims may now suggest themselves to those skilled in the art.

What is claimed is:

1. A self-orienting vibration sensitive device comprising a support, a vibrational system including a coil resiliently supported from said support and substantially constrained from rotation relative to said support, a magnet system mounted for free rotation relative to the axis of said coil, means for gravitationally biasing said magnet system to maintain said magnet fixed during rotation of said support, said magnet system having an air gap located with at least a portion of the periphery of the coil means extending into said air gap to form an electromagnetic coupling which is varied upon translational movement of said coil relative to said magnet system and which is substantially unchanged upon rotation of said support.

2. A self-orienting vibration sensitive device comprising a supporting means, a vibrational system including a disc having electrical conducting means forming at least one coil at the periphery of said disc, a resilient mounting for said disc secured to said supporting means and constrained from substantial rotation relative to said supporting means, a magnet system mounted for rotation relative to the axis of said disc, means for gravitationally biasing said magnet system to maintain said magnet system stationary during rotation of said support, said magnet system having an air gap located with at least a portion of the periphery of said disc extending into the air gap to form an electromagnetic coupling to said coil which is varied upon translational movement of said coil relative to said magnet and which is substantially unchanged upon rotation of said support.

3. The combination set forth in claim 1 in which, with said axis substantially horizontal, said air gap is symmetrical with respect to a vertical line passing through said axis for the production of a voltage in said coil proportional to the vertical component of the translational movement of said support.

4. The combination set forth in claim 3 in which said vibratory system is provided with a second coil and said magnet system is provided with a second air gap symmetrical with respect to a horizontal line passing through said axis and in which a portion of the periphery of said second coil is positioned in said air gap for production of a voltage in said second coil proportional to the horizontal component of the translational movement of said support.

5. The system set forth in claim 4 in which said first coil is provided with output terminals across which the voltage proportional to vertical translation of said support appears and in which said second coil is provided with a low impedance current path for providing stiffness in said vibrational system relative to horizontal translation of said support.

6. A self-orienting geophone which comprises a substantially horizontal cylindrical housing, and members for said housing having a mounting at the axis of said housing, a straight bar spring of substantially circular cross-section secured to said mounting and normally centered on said axis, said spring being constrained for rotation with said housing, a coil secured to and supported axially by the free end of said spring, a magnet structure supported on said mounting for free rotation relative thereto, means for gravitationally biasing said magnet to maintain said magnet fixed during rotation of said housing, said magnet system having an air gap with at least a portion of the periphery of said coil extending into said air gap to form an electromagnetic coupling which is varied upon translational movement of said housing by translation of said magnet relative to said coil and which is substantially unchanged upon rotation of said support.

7. A self-orienting vibration sensitive device comprising a support, a substantially circular coil, resilient means having substantial symmetry relative to the axis of said coil for axially supporting said coil from said support for vibrational movement in the plane of said coil, means secured to said support for establishing a magnetic field having unidirectional flux which links a segment of said coil at and adjacent a given point on the periphery thereof for generation of a voltage in said coil due to vibration relative to said last named means, and gravity controlled means for shifting the location of said given point through an angle equal to the angular rotation of said support relative to said axis in response to and concurrently with said rotation.

8. A self-orienting vibration sensitive device which comprises a housing having a cylindrical chamber therein and support means, a substantially circular coil, resilient means secured to said support and having substantial symmetry relative to the axis of said chamber and supporting said coil for vibrational movement in the plane of said coil and transverse to the axis of said chamber, means in said chamber for establishing a magnetic field having unidirectional flux which links a segment of said coil at and adjacent a given point on the periphery thereof for generation of a voltage in said coil due to vibration relative to said last named means, and gravity controlled means for shifting the location of said given point through an angle equal to the angular rotation of said housing relative to said axis in response to and concurrently with said rotation.

References Cited in the file of this patent

UNITED STATES PATENTS

| | | |
|---|---|---|
| 1,892,147 | Hayes | Dec. 27, 1932 |
| 2,269,453 | Gayhart | Jan. 13, 1942 |
| 2,551,417 | Carlisle | May 1, 1951 |
| 2,659,065 | Cordell | Nov. 10, 1953 |